(12) United States Patent
Booth et al.

(10) Patent No.: US 9,919,488 B2
(45) Date of Patent: Mar. 20, 2018

(54) ROTOR BLADE COMPONENTS FOR A WIND TURBINE AND METHODS OF MANUFACTURING SAME

(71) Applicant: General Electric Company, Schenectady, NY (US)

(72) Inventors: Michael Christopher Booth, Simpsonville, SC (US); Scott Gabell Riddell, Greer, SC (US); James Robert Tobin, Simpsonville, SC (US); William Max Gobeli, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 832 days.

(21) Appl. No.: 14/219,131

(22) Filed: Mar. 19, 2014

(65) Prior Publication Data

US 2015/0266249 A1 Sep. 24, 2015

(51) Int. Cl.

| | |
|---|---|
| *B29D 99/00* | (2010.01) |
| *F03D 1/06* | (2006.01) |
| *B29C 51/10* | (2006.01) |
| *B29C 44/18* | (2006.01) |
| *B29C 51/12* | (2006.01) |
| *B29K 25/00* | (2006.01) |
| *B29C 51/26* | (2006.01) |
| *B29L 31/08* | (2006.01) |
| *B29K 75/00* | (2006.01) |

(52) U.S. Cl.
CPC .......... *B29D 99/0025* (2013.01); *B29C 44/18* (2013.01); *B29C 51/105* (2013.01);
(Continued)

(58) Field of Classification Search
CPC .............. B29D 99/0025; Y02E 10/721; B29K 2025/06; B29K 2025/08; B29K 2075/00;
(Continued)

(56) References Cited

U.S. PATENT DOCUMENTS 3,814,351 A * 6/1974 Bielawa ................. B64C 27/10
244/17.19
4,295,790 A * 10/1981 Eggert, Jr. ............ F03D 1/0675
416/226
(Continued)

FOREIGN PATENT DOCUMENTS

| EP | 1880833 A1 | 1/2008 |
| EP | 2228198 A1 | 9/2010 |

(Continued)

OTHER PUBLICATIONS

Denmark Office Action issued in connection with corresponding DK Application No. PA201570141 dated Oct. 30, 2015.

*Primary Examiner* — Jessica Cahill
*Assistant Examiner* — Daphne M Barry
(74) *Attorney, Agent, or Firm* — Dority & Manning, P.A.

(57) ABSTRACT

Methods of manufacturing rotor blade components for a wind turbine and rotor blade components produced in accordance with such methods are disclosed. In one embodiment, the method generally includes heating first and second sheets of thermoplastic material to a forming temperature; placing the first sheet of thermoplastic material within a first half of a thermoforming mold and the second sheet of thermoplastic material in an opposite, second half of the thermoforming mold; forming the first sheet of thermoplastic material to the first half of the thermoforming mold; forming the second sheet of thermoplastic material to the second half of the thermoforming mold; compressing the first and second halves of the thermoforming mold so as to join at least a portion of the first and second sheets together; and, releasing the joined first and second sheets of thermoplastic material from the thermoforming mold so as to form the rotor blade component.

18 Claims, 6 Drawing Sheets

(52) U.S. Cl.
CPC ....... *B29D 99/0028* (2013.01); *F03D 1/0675* (2013.01); *F03D 1/0683* (2013.01); *B29C 51/12* (2013.01); *B29C 51/267* (2013.01); *B29K 2025/06* (2013.01); *B29K 2025/08* (2013.01); *B29K 2075/00* (2013.01); *B29K 2995/0063* (2013.01); *B29L 2031/085* (2013.01); *F05B 2240/122* (2013.01); *Y02E 10/721* (2013.01); *Y02P 70/523* (2015.11)

(58) Field of Classification Search
CPC ............ B29K 2995/0063; B29C 44/18; B29C 51/105; B29C 51/12; B29C 51/267; Y02P 70/523; F03D 1/0675
See application file for complete search history.

(56) References Cited

U.S. PATENT DOCUMENTS

| | | | |
|---|---|---|---|
| 6,612,810 B1* | 9/2003 | Olsen | F03D 80/40 415/4.5 |
| 7,157,034 B2 | 1/2007 | Bristow et al. | |
| 8,087,889 B2* | 1/2012 | Meldgaard | F03D 1/0675 416/24 |
| 8,382,440 B2* | 2/2013 | Baker | F03D 1/0675 416/226 |
| 8,673,106 B1* | 3/2014 | Jolley | B29C 43/18 156/285 |
| 2004/0197547 A1 | 10/2004 | Bristow et al. | |
| 2006/0056972 A1 | 3/2006 | Dalong | |
| 2010/0135796 A1* | 6/2010 | Kavala | F03D 1/0675 416/1 |
| 2010/0226775 A1 | 9/2010 | Hartman | |
| 2011/0150661 A1 | 6/2011 | Robbins et al. | |
| 2012/0034833 A1 | 2/2012 | Schaube et al. | |
| 2013/0129519 A1 | 5/2013 | Nielsen et al. | |
| 2013/0266441 A1* | 10/2013 | Enevoldsen | F03D 7/0204 416/1 |

FOREIGN PATENT DOCUMENTS

| | | |
|---|---|---|
| WO | WO 2008/035097 A1 | 3/2008 |
| WO | 2012141723 A2 | 10/2012 |
| WO | WO 2013/028172 A1 | 2/2013 |

\* cited by examiner

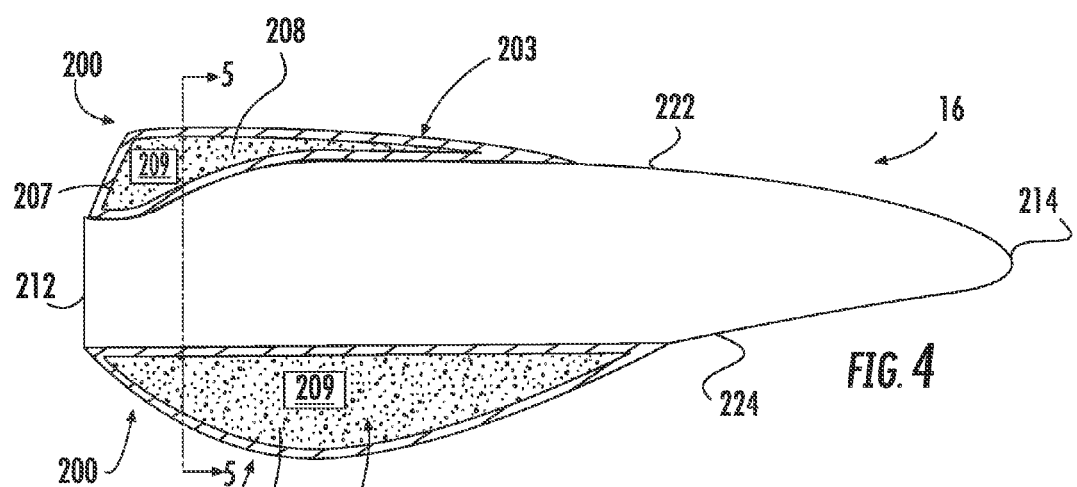
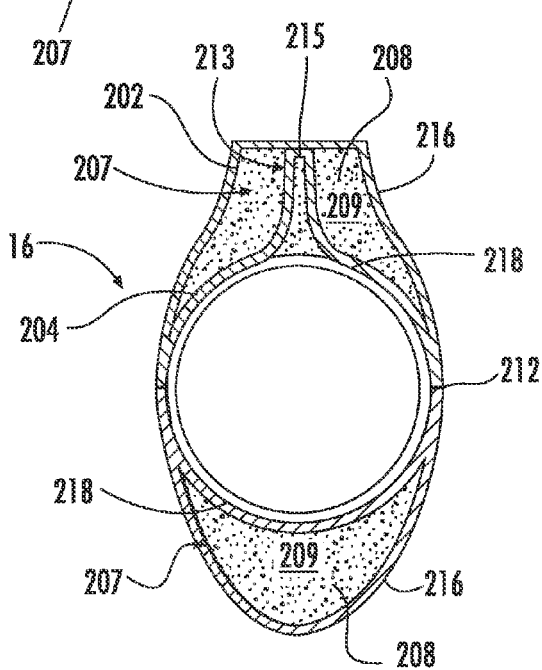

ROTOR BLADE COMPONENTS FOR A WIND TURBINE AND METHODS OF MANUFACTURING SAME

FIELD OF THE INVENTION

The present subject matter relates generally to wind turbines and, more particularly, to rotor blade components for a wind turbine and methods of manufacturing same.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The lift force is generated when the flow from a leading edge to a trailing edge creates a pressure difference between the top and bottom surfaces of the blade. Ideally, the flow is attached to the top surface from the leading edge to the trailing edge. However, when the angle of attack of the flow exceeds a certain critical angle, the flow does not reach the trailing edge, but leaves the surface at a flow separation line, which decreases potential energy production. In addition, flow separation may be dependent upon the blade root and/or transition regions of the blade, and therefore may occur regardless of the angle of attack.

Hence, in order to increase the energy conversion efficiency during normal operation of the wind turbine, it is desired to increase the lift force of the blades while decreasing the drag force. To this purpose, it is advantageous to increase the attached-flow region and to reduce or eliminate the detached-flow region by moving flow separation nearer the trailing edge of the blade. As such, it is known in the art to change the aerodynamic characteristics of wind turbine blades by adding various add-ons and/or components on the surface of the blade. For example, such add-ons may generally include leading edge extensions, trailing edge extensions, vortex generators, fairings, blade root enhancements, bumps, winglets, airflow modifying elements (e.g. spoilers, flaps, etc.), and/or any other suitable components.

The rotor blades and larger add-ons are typically constructed of a fiberglass composite material due to their size and generally require specialized tooling and/or molds for their manufacture. For example, the blade halves of a conventional rotor blade are typically formed in large molds that are custom made for the particular size and shape of the rotor blade being produced. More specifically, various rotor blades and/or large add-ons may be constructed using Resin Transfer Molding (RTM), such as Vacuum Assisted Resin Transfer Molding (VARTM). With the VARTM process, composite parts are made by placing dry fiber reinforcing fabrics into a single part, open mold, enclosing the mold into a vacuum bag, and drawing a vacuum in order to ensure a complete preform infiltration with resin. The mold is then heated to allow the part to cure. The VARTM process makes it possible to produce relatively inexpensive, large, and complex parts in a single process.

Various issues associated with previous methods for manufacturing rotor blades, however, have been identified. For example, many of the RTM processes are time-consuming due to the required cure time for each part. In addition, since rotor blades are constantly moving and flexing in the wind, add-on parts need to accommodate movements of the blade. However, thin fiberglass composite parts may be inherently brittle and can resist movement of the rotor blades. As such, in many instances, the thickness of the fiberglass parts can be increased to provide a more durable part, but such a modification adds weight to the rotor blade.

Accordingly, there is a need for improved methods of manufacturing rotor blade components that addresses the aforementioned issues. For example, a method of manufacturing light-weight, durable rotor blade components that reduce production time and costs, but that is suitable for large components would be advantageous.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method of manufacturing rotor blade components for a wind turbine. The method generally includes heating a first sheet of thermoplastic material and a second sheet of thermoplastic material to a forming temperature. The heated sheets may then be placed within first and second halves of a thermoforming mold. The method also includes forming the first sheet of thermoplastic material to the first half of the thermoforming mold and the second sheet of thermoplastic material to the second half of the thermoforming mold. The first and second halves of the thermoforming mold may then be compressed so as to join at least a portion of the first and second sheets of thermoplastic material together. The method then includes releasing the joined first and second sheets of thermoplastic material from the thermoforming mold so as to form the rotor blade component.

In one embodiment, the first and second sheets of thermoplastic material may include a thermoplastic olefin, an acrylonitrile butadiene styrene (ABS) thermoplastic, a fiber-reinforced plastic, or similar. In a further embodiment, the step of forming the first and second sheets of thermoplastic material to the first and second halves of the thermoforming mold may also include at least one of vacuum-forming or pressure-forming. In still another embodiment, the method may further include a step of inserting a filler material within the rotor blade component. For example, in one embodiment, the filler material may include a low-density foam.

In a further embodiment, the method may include a step placing one or more support members into the thermoforming mold before placing the first and second sheets of thermoplastic material within the mold. In further embodiments, the one or more support members may include at least one of a laminate composite material a metal material, a polymer material, a wood material, or similar.

In additional embodiments, the rotor blade component may include any of the following: a rotor blade shell, a leading edge extension, a trailing edge extension, a blade root enhancement, a stall strip, a flap, a low-load bump, a winglet, a vortex generator, a fairing, an airflow modifying element, or similar.

In still another embodiment, the step of compressing the first and second halves of the thermoforming mold so as to join at least a portion of the first and second sheets of thermoplastic material together may further include plastic welding the first portion to the second portion. In yet another embodiment, the step of compressing the first and second halves of the thermoforming mold so as to join at least a portion of the first and second sheets of thermoplastic material together further includes sealing the first and second sheets of thermoplastic material so as to form an impermeable interior compartment. As such, the rotor blade component may have improved weatherability and may be water-resistant.

In yet another embodiment, the method may include a step of forming one or more continuous locating features on the rotor blade component via the thermoforming mold. The one or more locating features may be configured to correspond to one or more structures on the rotor blade. As such, the locating features assist in aligning the rotor blade component on the rotor blade. In still another embodiment, the method may include attaching the rotor blade component to the rotor blade via a strain-isolating bond layer. Thus, the bond layer is disposed between the rotor blade component and the rotor blade and includes at least one of an epoxy, a polyurethane, a methacrylate, an acrylic, or similar.

In another aspect, the present subject matter is directed to a method of manufacturing a rotor blade component for a wind turbine. The method generally includes heating a first sheet of thermoplastic material and a second sheet of thermoplastic material to a forming temperature. The method also includes placing one or more support members within a thermoforming mold. A next step includes placing first and second sheets of thermoplastic material within first and second halves of a thermoforming mold, respectively. The method may also include forming the first and second sheets of thermoplastic material to the first and second halves of the thermoforming mold. Next, the method may include compressing the first and second halves of the thermoforming mold so as to join or infuse at least a portion of the first and second sheets of thermoplastic material together. A further step includes releasing the joined first and second sheets of thermoplastic material from the thermoforming mold so as to form the rotor blade component, wherein the support members are molded into the rotor blade component. It should be understood that the method may further include any of the steps and/or features described herein.

In still another aspect, the present subject matter is directed to a rotor blade component for a wind turbine. The rotor blade component generally includes a body defining a profile of the rotor blade component. The body includes a first portion constructed of a first thermoplastic material, a second portion constructed of a second thermoplastic material, and an internal volume. The rotor blade component may also include a filler material configured within the internal volume of the body. Further, the first and second portions may be joined or infused together at a seam via a twin sheet thermoforming process. In another embodiment, the rotor blade component further includes one or more support members configured within the internal volume of the body. It should be understood that the rotor blade component may also include any one of or a combination of the features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 illustrates a span-wise view of a rotor blade having rotor blade components installed thereon manufactured according to the present disclosure;

FIG. 5 illustrates a chord-wise view of a rotor blade having rotor blade components installed thereon manufactured according to the present disclosure;

DETAILED DESCRIPTION OF THE INVENTION

Figure 1:
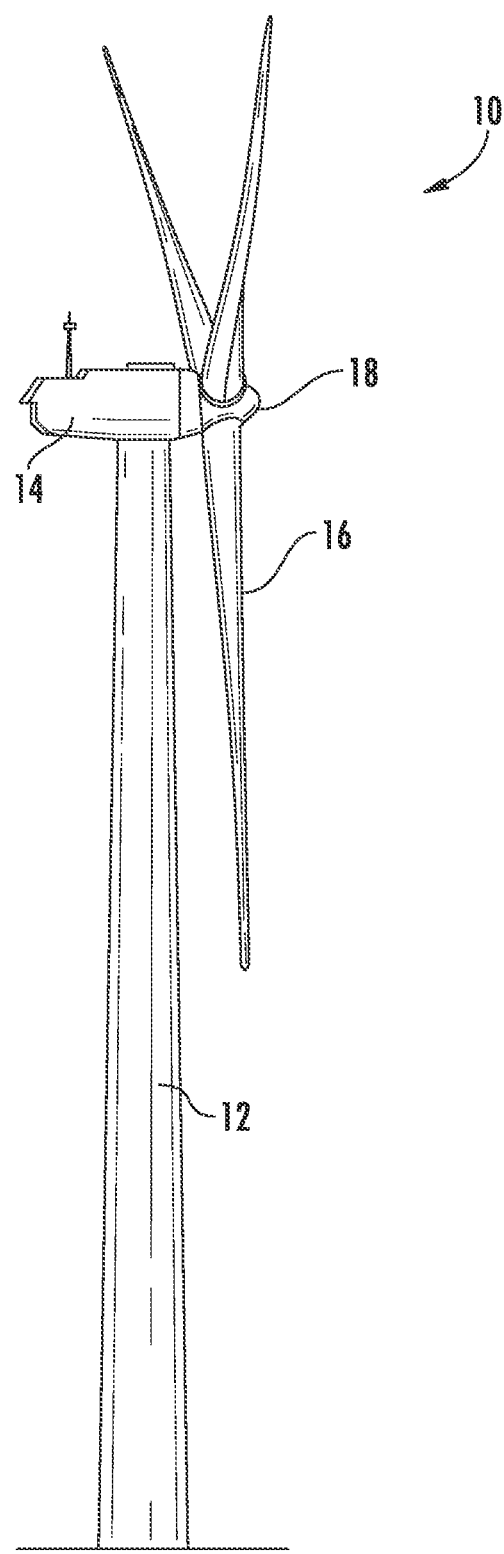
FIG. 1 illustrates a perspective view of a conventional wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to improved methods of manufacturing rotor blade components for wind turbines and rotor blade components produced in accordance with such methods. In particular, the disclosed rotor blade components may be manufactured using a twin-sheet thermoforming process. More specifically, in one embodiment, the twin-sheet thermoforming process may include heating two sheets of thermoplastic material to a forming temperature and then vacuum- or pressure-forming the sheets essentially simultaneously with separate top and bottom molds. For example, while still at their forming temperature and while remaining in their respective molds, the sheets are brought together under high pressure or vacuum and connected, e.g. plastic-welded or fused together, at a mold-weld line or seam, i.e. wherever the molds dictate a weld, to form the rotor blade component. In a further embodiment, the rotor blade components may also be injected with a filler material for added strength.

Rotor blade components manufactured according to the methods described herein provide many advantages not present in the cited art. For example, the methods described herein are capable of producing light-weight, relatively large or small parts quickly and efficiently. As such, the disclosed rotor blade components can be manufactured relatively inexpensively when compared to conventional manufacturing processes. Further, in one embodiment, the present subject matter provides durable rotor blade components manufactured from relatively low-strength materials. In addition, in certain embodiments including a filler material, the material may provide additional strength. Moreover, the rotor blade components as described herein are typically more flexible than conventional fiberglass parts. As such, the rotor blade components of the present disclosure are configured to absorb stress or strain of the rotor blade more effectively than components made of fiberglass. Still further advantages include rotor blade components having high weatherability, including improved strength, stiffness, and water-resistance.

Referring now to the drawings, FIG. 1 illustrates perspective view of a wind turbine 10 of conventional construction. The wind turbine 10 includes a tower 12 with a nacelle 14 mounted thereon. A plurality of rotor blades 16 are mounted to a rotor hub 18, which is, in turn, connected to a main flange that turns a main rotor shaft. The wind turbine power generation and control components are housed within the nacelle 14. It should be appreciated that the wind turbine 10 of FIG. 1 is provided for illustrative purposes only to place the present invention in an exemplary field of use. Thus, one of ordinary skill in the art should understand that the invention is not limited to any particular type of wind turbine configuration.

Figure 2:
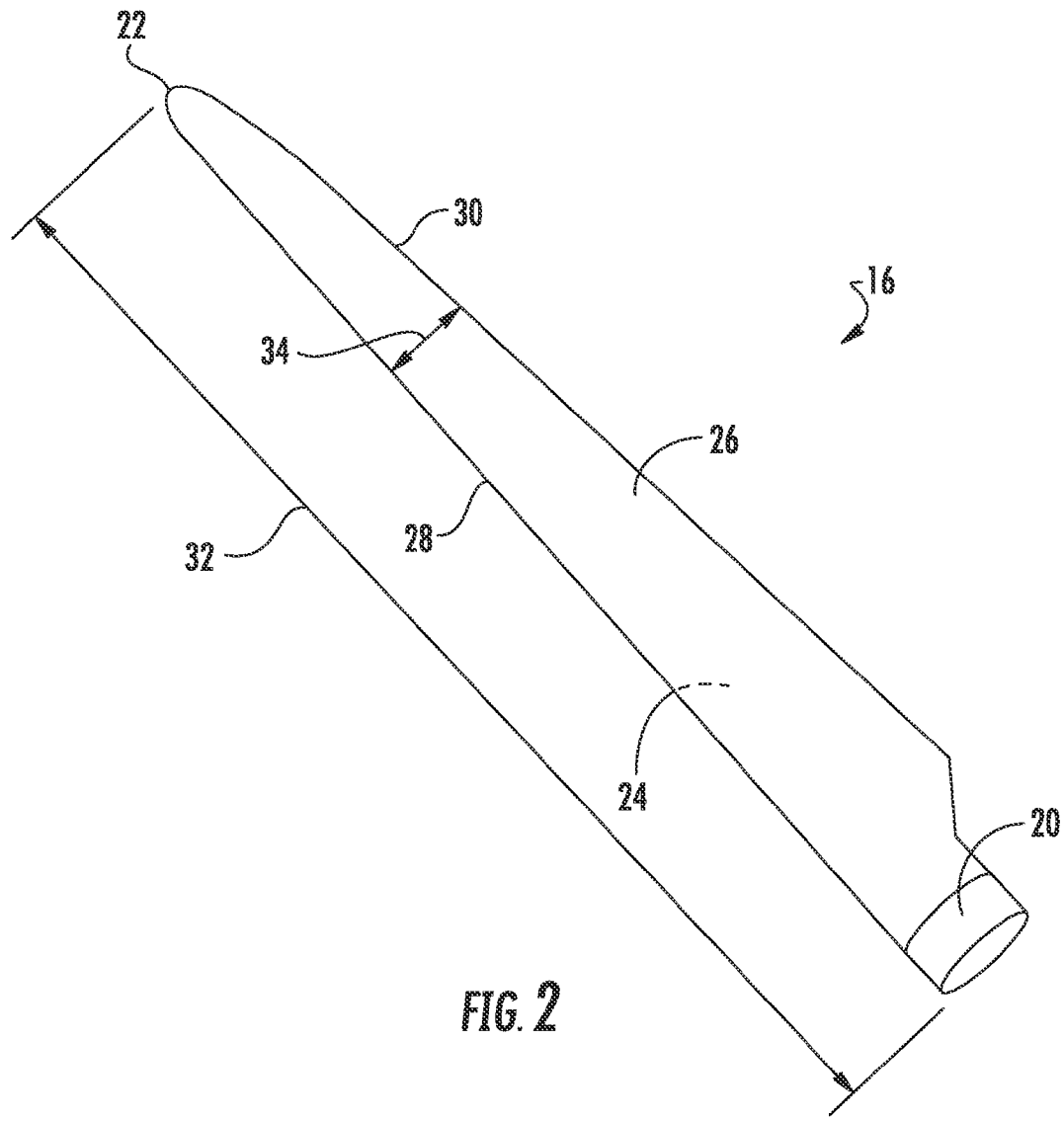
FIG. 2 illustrates a perspective view of a conventional rotor blade.

Referring now to FIG. 2, there is illustrated a perspective view of a rotor blade 16 of conventional construction. As shown, the rotor blade 16 includes a blade root 20 configured for mounting the rotor blade 16 to a mounting flange (not shown) of the wind turbine hub 18 (FIG. 1) and a blade tip 22 disposed opposite the blade root 20. The rotor blade 16 may also include a pressure side 24 and a suction side 26 extending between a leading edge 28 and a trailing edge 30. Additionally, the rotor blade 16 may include a span 32 defining the total length between the blade root 20 and the blade tip 22 and a chord 34 defining the total length between the leading edge 28 and the trailing edge 30. As is generally understood, the chord 34 may vary in length with respect to the span 32 as the rotor blade 16 extends from the blade root 20 to the blade tip 22.

Additionally, the rotor blade 16 may define any suitable aerodynamic profile. Thus, in several embodiments, the rotor blade 16 may define an airfoil shaped cross-section. For example, the rotor blade 16 may be configured as a symmetrical airfoil or a cambered airfoil. Further, the rotor blade 16 may also be aeroelastically tailored. Aeroelastic tailoring of the rotor blade 16 may entail bending the blade 16 in a generally chordwise direction and/or in a generally spanwise direction. The chordwise direction generally corresponds to a direction parallel to the chord 34 defined between the leading and trailing edges 28, 30 of the rotor blade 16. Additionally, the spanwise direction generally corresponds to a direction parallel to the span 32 of the rotor blade 16.

Figure 3:
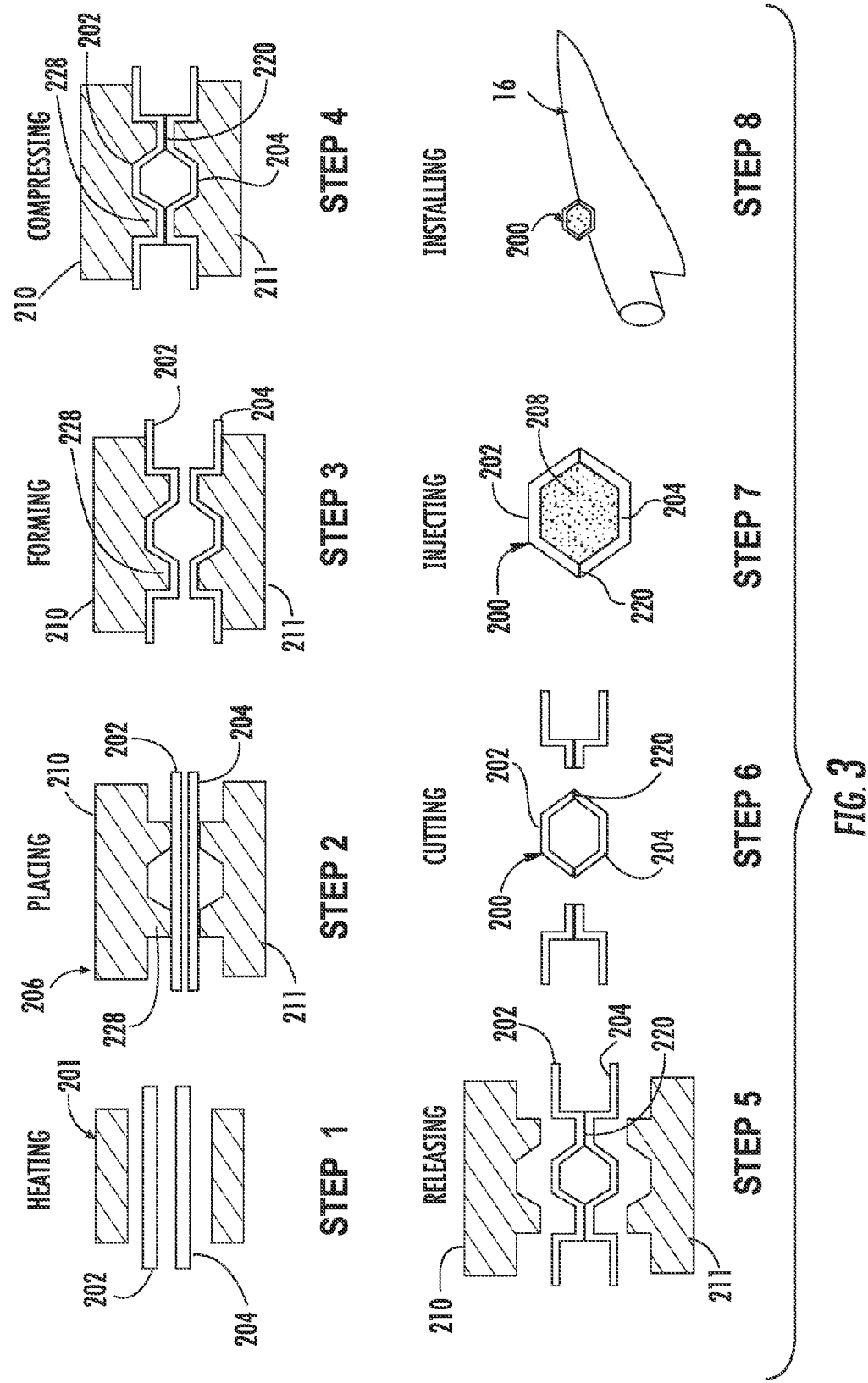
FIG. 3 illustrates a schematic diagram of one embodiment of a process of manufacturing a rotor blade component according to the present disclosure.

Referring now to FIGS. 3-5, various rotor blade components 200 manufactured according to the present subject matter assembled on the rotor blade 16 are illustrated. In particular, FIG. 3 illustrates a schematic diagram of one embodiment of a process of manufacturing a rotor blade component 200 according to the present disclosure. FIG. 4 illustrates a cross-sectional, span-wise view of a plurality of rotor blade components 200 manufactured according to the present disclosure and attached to the rotor blade 16. FIG. 5 illustrates a cross-sectional, chord-wise view of the rotor blade components 200 attached to the rotor blade 16. More specifically, as shown in FIGS. 4 and 5, the illustrated rotor blade components 200 include a leading edge extension 203 and a trailing edge extension 205. In further embodiments, the rotor blade components 200 can be any suitable component for the rotor blade, including, but not limited to a blade root enhancement, a low-load bump, a winglet, a vortex generator, a fairing, an airflow modifying element, or any other suitable add-on for the rotor blade 16.

Referring particularly to FIG. 3, in one embodiment, at least two sheets of thermoplastic material 202, 204 are heated to a forming temperature at step 1. The term "forming temperature" as used herein is meant to encompass its ordinary meaning in the art. For example, in one embodiment, the forming temperature is the temperature at which the sheets of thermoplastic material become pliable and/or formable. In addition, the sheets 202, 204 of thermoplastic material may be any suitable polymer that becomes pliable or moldable above a specific temperature, i.e. the forming temperature, and returns to a solid state upon cooling. For example, in one embodiment, the sheets 202, 204 of thermoplastic material may include a thermoplastic olefin, an acrylonitrile butadiene styrene (ABS) thermoplastic, a fiber-reinforced plastic, or similar.

At step 2, and while remaining at their forming temperatures, the sheets 202, 204 may be placed into a thermoforming mold 206 having first and second molds 210, 211, e.g. top and bottom molds. It should be understood that the mold 206 may have any suitable shape, size, and/or components. As such, the mold 206 components are designed to form any suitable rotor blade component 200, such as for example, a blade root enhancement, a low-load bump, a winglet, a vortex generator, a fairing, an airflow modifying element, or any other suitable add-on for the rotor blade 16. For example, as shown in the illustrated embodiment of FIG. 3, the molds 210, 211 are configured to form an airflow modifying element, e.g. a vortex generator. In addition, the mold 206 may be designed to include one or more locating features, as will be discussed in more detail in reference to FIGS. 6 and 7.

Still referring to FIG. 3, the sheets 202, 204 may then be vacuum- or pressure-formed to their respective molds 210, 211 at step 3. For example, in one embodiment, the sheets 202, 204 may be pressure-formed using any suitable means, such as mechanical pressure-forming or similar. As such, the sheets 202, 204 take on the shape of the molds 210, 211. At step 4, the molds 210, 211 may be compressed together so as to join at least a portion of the sheets 202, 204 together. For example, as shown, the sheets 202, 204 may be joined together along a weld-line 220. More specifically, the sheets 202, 204 may be joined together using any suitable joining method, including, but not limited to plastic-welding, fusion, diffusion bonding, and/or solvent bonding. The diffusion bonding process allows plastic materials (where applicable) to be joined without the use of solvents or adhesives. In addition, as shown in the illustrated embodiments, the molds 210, 211 may also each include a bump 228 or raised area that ensures a portion of the sheets 202, 204 are bonded together. In addition, the bump(s) 228 prevents another portion of the sheets 202, 204 from contacting each other. Thus, in one embodiment, a pressure sufficient to join the sheets 202, 204 along bond line 220 (corresponding to bump(s) 228) may be less than a pressure sufficient to join the sheets 202, 204 along their entire length.

Further, in one embodiment, compressing the first and second halves 210, 211 of the thermoforming mold 206 so as to join at least a portion of the first and second sheets 202, 204 of thermoplastic material together may also include sealing the first and second sheets 202, 204 of thermoplastic material so as to form an impermeable interior compartment that is water-resistant.

At step 5, the process may include releasing the joined first and second sheets 202, 204 of thermoplastic material from the thermoforming mold 206 so as to form the rotor blade component 200. For example, as shown, the mold 206 may be opened such that the formed rotor blade component 200 can be removed from the mold 206 and thereafter installed on a rotor blade 16 (step 8). In another embodiment, the process may include cutting extra material from the component 200. For example, at step 6, the flanges 216, 218 are cut from the rotor blade component 200. At step 7, the rotor blade component 200 may optionally be injected with a filler material 208. For example, as shown, the rotor blade component 200 is injected with a filler material, e.g. a foam material.

As mentioned, at step 8, the rotor blade component 200 may be installed onto the rotor blade 16 at any suitable location. In some embodiments, mechanical fasteners such as nut/bolt combinations, nails, screws, rivets, or other suitable mechanical fasteners may be utilized to mount the rotor blade component to the rotor blade 16. In other embodiments, devices such as hinges, in particular piano hinges, may be utilized to mount the rotor blade component 200 to the rotor blade 16. In other embodiments, hook-and-loop fasteners or other suitable fasteners may be utilized. In still other embodiments, a bond layer may be disposed between the rotor blade component 200 and the rotor blade 16 so as to bond the rotor blade component 200 to the rotor blade 16. The bond layer may in general be any suitable adhesive or bonding material. In some embodiments, the bond layer may have various characteristics for reducing the strain associated with mounting the rotor blade component 200 to the rotor blade 16. The bond layer may thus at least partially absorb strain from the rotor blade 16 and prevent this strain from being transmitted to the rotor blade component 200, and may be formed from materials that are relatively flexible and relatively tough. In exemplary embodiments, the bond layer may generally isolate the strain associated with the rotor blade 16. By generally isolating the strain, the bond layer may generally prevent a relatively substantial portion of the rotor blade 16 strain from being transmitted through the bond layer to the rotor blade component 200.

In some embodiments, for example, the bond layer may be relatively elastic, and may thus have a relatively low shear modulus. The shear modulus may be determined over suitable environmental conditions or ranges of environmental conditions generally expected for a wind turbine 10. For example, in some embodiments, the shear modulus of the bond layer may be approximately equal to or less than 5 gigapascals. In other embodiments, the bond layer may have a shear modulus approximately less than or equal to 3 gigpascals, 1 gigapascal, 500 megapascals, 300 megapascals, 100 megapascals, 20 megapascals, or 10 megapascals. The relatively low shear modulus of the bond layer may advantageously allow the bond layer to absorb strain from the rotor blade 16 and reduce or prevent the strain being transmitted through the bond layer to the rotor blade component 200.

Further, in some embodiments, the bond layer may have a relatively low durometer. For example, the durometer of the bond layer may be approximately less than or equal to 100, 90, 80, 70, or 60. The relatively low durometer of the bond layer may advantageously allow the bond layer to absorb strain from the rotor blade 16 and reduce or prevent the strain being transmitted through the bond layer to the rotor blade component 200. In some embodiments, the bond layer may comprise an epoxy, polyurethane, methacrylate such as methyl methacrylate or another suitable methacrylate, or an acrylic. In embodiments wherein the bond layer is an acrylic, the acrylic may be an acrylic foam, such as a closed cell acrylic foam, or any acrylic solid or non-foam.

Referring now to FIGS. 4 and 5, the manufactured rotor blade components 200 include a body 207 that generally defines a profile or shape of the component 200. Further, the body 207 generally defines an internal volume 209. As mentioned, in various embodiments, the internal volume 209 of the body 207 may be filled with a filler material 208, e.g. a foam material. The filler material 208 may generally be disposed throughout the interior volume 209 of the body 207 of the blade component 200. In particular, the filler material 208 may be configured to occupy or fill at least a portion of the internal volume 209 of the body 207 of the rotor blade component 200. As used herein with reference to the figures, the term "internal volume" refers to the volume of the body 207 of the various rotor blade components 200 defined by the enclosure of the first and second sheets 202, 204. In several embodiments, the filler material 208 may be configured to occupy a substantial portion of the inner volume 209 of the body 207. For example, the filler material 208 may be configured to occupy greater than 50% of the inner volume of the body 207, such as greater than 75% of the inner volume or greater than 85% of the inner volume or greater than 95% of the inner volume. As such, the filler material 208 may improve the strength of the rotor blade component 200. Alternatively, the filler material 208 may be configured to occupy less than 50% of the inner volume of the body 207.

It should be appreciated that the filler material 208 may generally include any suitable material which is capable of being injected into the rotor blade component 200. For example, in several embodiments, the filler material 208 may comprise a relatively lightweight, low-density foam material. More specifically, the filler material 208 may include a foam material having a density ranging from about 0.5 pounds per cubic feet (lbs/ft$^3$) to about 3 lbs/ft$^3$, more preferably about 2 lbs/ft$^3$. In further embodiments, the filler material 208 may have a density of less than 0.5 lbs/ft$^3$ or a density greater than 3 lbs/ft$^3$, such as 20 lbs/ft$^3$, or any other suitable density. Suitable low-density foam materials may include, but are not limited to, polystyrene foams (e.g., expanded polystyrene foams), polyurethane foams (e.g. polyurethane closed-cell foam), other foam rubbers/resin-based foams and various other open cell and closed cell foams. Alternatively, the filler material 208 may include other suitable low-density materials, such as balsa wood, cork and the like.

In further embodiments, the rotor blade component 200 may also include one or more support members 213 or ribs configured within the internal volume 209. The support members 213 may generally be configured as structural components configured within the rotor blade components 200 manufactured according to the methods described herein. For example, the support members 213 may be configured to provide stiffness and/or strength to the rotor blade component 200 during operation of the wind turbine 10. Thus, it should be appreciated that the support members 213 may generally have any suitable shape, size, cross-section and/or configuration that permits the support members 213 to function as described herein. More specifically, as shown in FIG. 5, the support members 213 may extend in a generally span-wise direction, such as from generally adjacent the blade root 212 towards the blade tip 214, in the filler material 208 of the rotor blade component 200. In addition, the support members 213 may extend in a generally chord-wise direction, such as from generally the leading edge 28 to the trailing edge 28.

In addition, the support member 213 may be manufactured into the rotor blade component 200 in a variety of ways. For example, in one embodiment, one of the molds 210, 211 may be designed to include a support member 213 profile such that vacuum-forming one of the sheets 202, 204 to the molds 210, 211 forms the support member 213 into one of the sheets 202, 204. In another embodiment, the support member 213 may be formed by adding additional material within one of the molds 210, 211 and vacuum-forming the sheets 202, 204 over the material such that the material is molded into or embedded within the sheets 202, 204. Further, the one or more support members 213 may be configured such that when the support member 213 is formed in one of the sheets, a portion of the support member 213 engages an opposing sheet of material so as to provide an additional bonding opportunity between the sheets 202, 204. More specifically, as shown in FIG. 5, the support member 213 is formed in sheet 204 such that a top portion 215 of the support member 213 contacts sheet 202 and bonds thereto.

In various embodiments, the support members 213 may generally be formed from any suitable material. In several embodiments, the support members 213 may be formed from a relatively stiff and/or durable material so as to provide stiffness and/or strength to the rotor blade component 200. For example, the support members 213 may be formed from any suitable laminate composite materials (e.g., fiber-reinforced laminates), polymer materials (e.g., high strength plastics), metal materials (e.g., steel or aluminum), a wood material or any other suitable materials or combinations of materials. Additionally, it should be appreciated that, although each of the disclosed rotor blade components 200 are depicted as including one support member 210, the rotor blade components 200 may generally include any number of support members 210, such as two or more support members 210. Additionally, the support members 210 may be configured as a solid (i.e., non-hollow) structural component defining any suitable cross-sectional shape or size. Alternatively, the support members 213 may generally be configured as hollow components defining any suitable cross-sectional shape or size. It should be understood that the support members 213 and/or the filler material 208 may also provide buckling resistance to the rotor blade component 200.

Figure 6:
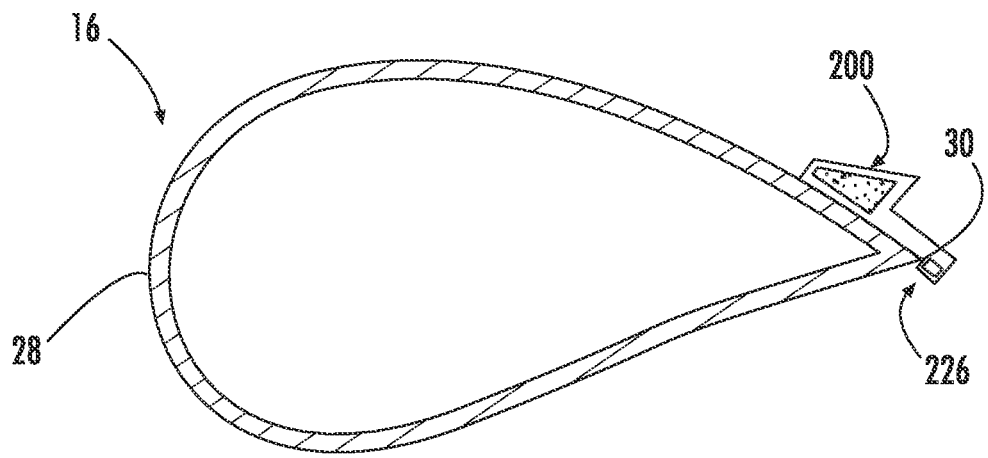
FIG. 6 illustrates another chord-wise view of a rotor blade having rotor blade components installed thereon manufactured according to the present disclosure.
Figure 7:
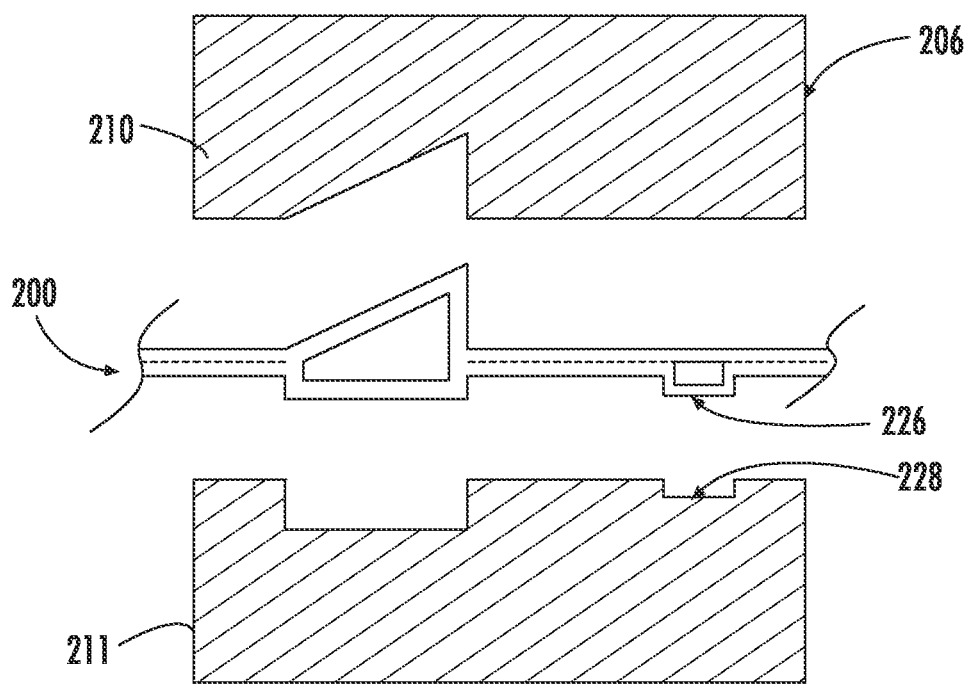
FIG. 7 illustrates one embodiment of a thermoforming mold according to the present disclosure; and, FIG. 8 illustrates a flow diagram of one embodiment of a method of manufacturing a rotor blade component according to the present disclosure.

Referring now to FIGS. 6 and 7, the manufacturing process as described herein may further include forming one or more continuous locating features 226 on the rotor blade component 200 via the thermoforming mold 206. For example, in one embodiment, the thermoforming mold 206 may include one or more profiles 228 (e.g. recesses or protrusions) that form at least one locating feature 226 in the rotor blade component 200. The locating features 226 are configured to correspond to one or more structures on the rotor blade, e.g. the trailing edge 30, the leading edge 28, the blade root 20, the blade tip 22, or any other suitable feature that is a part of the rotor blade 16 or added onto the rotor blade 16. As such, the locating feature(s) 226 are configured to assist in aligning the rotor blade component 20 on the rotor blade 16.

Similarly, in further embodiments, the locating features 226 may be formed into the sheets 202, 204 by placing one or more support members 213 (described above) within the molds 210, 211. As such, the same molds 210, 211 may be used for various components, but different locating features and/or support members 213 may be molded therein. In still additional embodiments, the support members 213 and/or locating features may include a fastener molded into the sheets 202, 204. As such, the fastener(s) may provide attachment means for securing the rotor blade component(s) onto the rotor blade 16.

Figure 8:
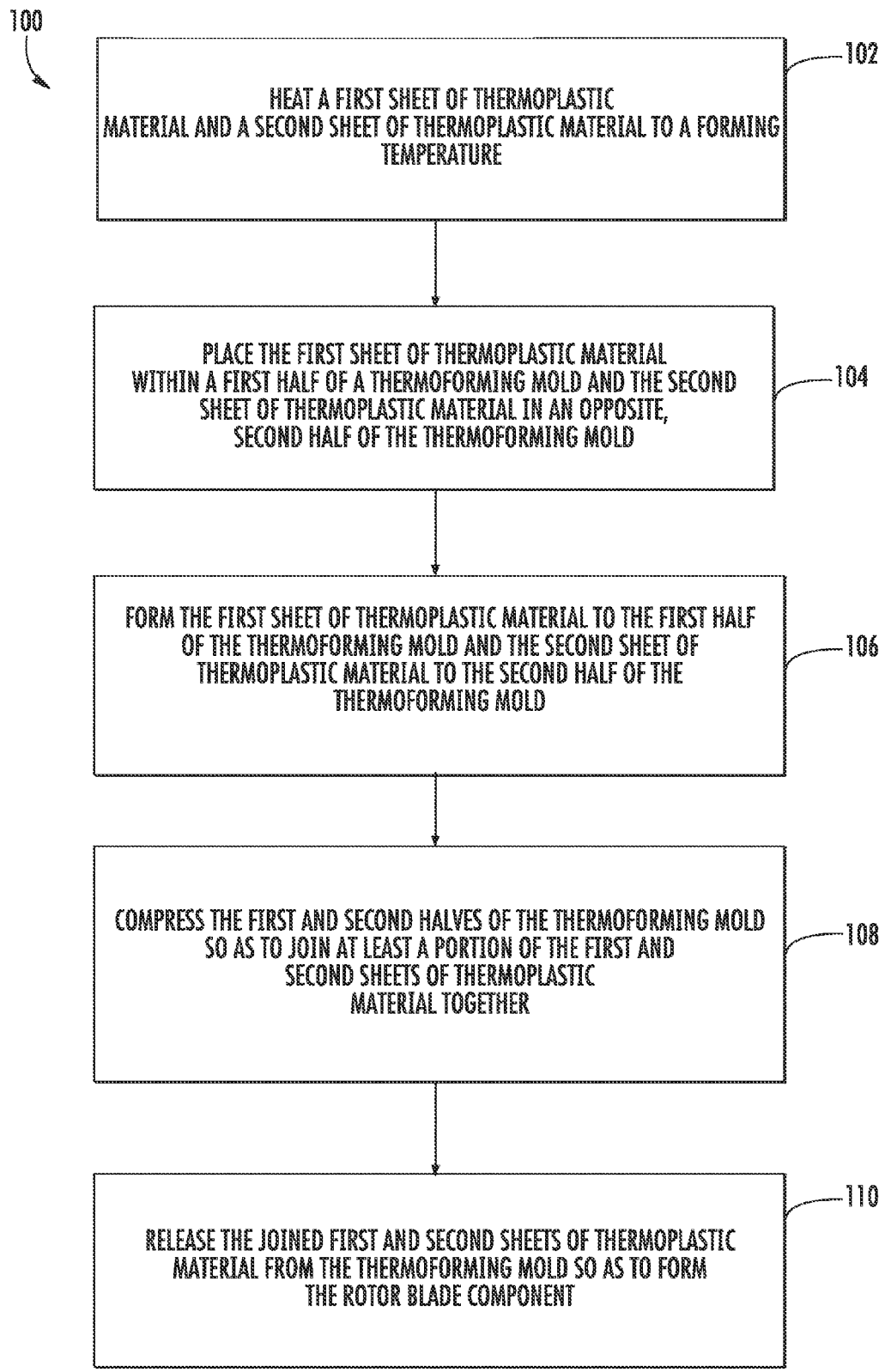

Referring now to FIG. 8, one embodiment of a method 100 for manufacturing a rotor blade component according to the present subject matter is illustrated. As shown, the method 100 may include a step 102 of heating a first sheet of thermoplastic material and a second sheet of thermoplastic material to a forming temperature. A next step 104 may include placing the first sheet of thermoplastic material within a first half of a thermoforming mold and the second sheet of thermoplastic material in an opposite, second half of the thermoforming mold. The method 100 may also include a step 106 of forming the first sheet of thermoplastic material to the first half of the thermoforming mold and the second sheet of thermoplastic material to the second half of the thermoforming mold. Another step 108 may include compressing the first and second halves of the thermoforming mold so as to join at least a portion of the first and second sheets of thermoplastic material together. The method 100 may also include a step 110 of releasing the joined first and second sheets of thermoplastic material from the thermoforming mold so as to form the rotor blade component.

It should be appreciated that, although the various method elements 102, 104, 106 illustrated in FIG. 8 are shown in a particular order, the elements may generally be performed in any sequence and/or order consistent with the disclosure provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of manufacturing a rotor blade add-on component for a rotor blade of a wind turbine, the rotor blade having a pressure side and a suction side extending between a leading edge and a trailing edge between a blade root and blade tip, the method comprising:
heating a first sheet of thermoplastic material and a second sheet of thermoplastic material to a forming temperature;
placing the first sheet of thermoplastic material within a first half of a thermoforming mold and the second sheet of thermoplastic material in an opposite, second half of the thermoforming mold;

forming the first sheet of thermoplastic material to the first half of the thermoforming mold and the second sheet of thermoplastic material to the second half of the thermoforming mold;

compressing the first and second halves of the thermoforming mold so as to join at least a portion of the first and second sheets together and form the rotor blade add-on component; and, releasing the rotor blade add-on component from the thermoforming mold, the rotor blade add-on component comprising one of a leading edge extension, a trailing edge extension, a blade root enhancement, a stall strip, a flap, a low-load bump, a winglet, a vortex generator, a fairing, or an airflow modifying element, the rotor blade add-on component shaped to attach to at least one of the pressure side or the suction side of the rotor blade.

2. The method of claim 1, wherein forming the first sheet of thermoplastic material to the first half of the thermoforming mold and the second sheet of thermoplastic material to the second half of the thermoforming mold further comprises at least one of vacuum-forming or pressure-forming.

3. The method of claim 1, wherein the first and second sheets of thermoplastic material comprises at least one of a thermoplastic olefin, an acrylonitrile butadiene styrene (ABS) thermoplastic, or a fiber-reinforced plastic.

4. The method of claim 1, further comprising inserting a filler material within the rotor blade add-on component.

5. The method of claim 4, wherein the filler material comprises a low-density foam.

6. The method of claim 4, wherein the one or more support members may include at least one of a laminate composite material, a metal material, a polymer material, or a wood material.

7. The method of claim 1, further comprising placing one or more support members into the thermoforming mold before placing the first and second sheets of thermoplastic material within the mold.

8. The method of claim 1, wherein compressing the first and second halves of the thermoforming mold so as to join at least a portion of the first and second sheets of thermoplastic material together further comprises plastic welding the first sheet to the second sheet.

9. The method of claim 1, wherein compressing the first and second halves of the thermoforming mold so as to join at least a portion of the first and second sheets of thermoplastic material together further comprises sealing the first and second sheets of thermoplastic material so as to form an impermeable interior compartment.

10. The method of claim 1, further comprising forming one or more continuous locating features on the rotor blade add-on component via the thermoforming mold, the one or more locating features corresponding to one or more structures on the rotor blade, wherein the locating features assist in aligning the rotor blade add-on component on the rotor blade.

11. The method of claim 1, further comprising attaching the rotor blade add-on component to the rotor blade via a strain-isolating bond layer, the bond layer disposed between the rotor blade add-on component and the rotor blade, wherein the bond layer comprises at least one of an epoxy, a polyurethane, a methacrylate, and an acrylic.

12. The method of claim 1, further comprising cutting extra material from the rotor blade add-on component.

13. A method of manufacturing a rotor blade add-on component for a rotor blade of a wind turbine, the rotor blade having a pressure side and a suction side extending between a leading edge and a trailing edge between a blade root and a blade tip, the method comprising:

heating a first sheet of thermoplastic material and a second sheet of thermoplastic material to a forming temperature;

placing one or more support members within a thermoforming mold;

placing a first sheet of thermoplastic material within a first half of the thermoforming mold and a second sheet of thermoplastic material in an opposite, second half of the thermoforming mold;

forming the first sheet of thermoplastic material to the first half of the thermoforming mold and the second sheet of thermoplastic material to the second half of the thermoforming mold;

compressing the first and second halves of the thermoforming mold so as to join at least a portion of the first and second sheets together and form the rotor blade add-on component, wherein the support members are molded into the rotor blade add-on component; and, releasing the rotor blade add-on component from the thermoforming mold, the rotor blade add-on component comprising one of a leading edge extension, a trailing edge extension; a blade root enhancement, a stall strip, a flap, a low-load bump; a winglet, a vortex generator, a fairing, or an airflow modifying element, the rotor blade add-on component shaped to attach to at least one of the pressure side or the suction side of the rotor blade.

14. The method of claim 13, wherein the first and second sheets of thermoplastic material comprise at least one of a thermoplastic olefin, an acrylonitrile butadiene styrene (ABS) thermoplastic, or a fiber-reinforced plastic.

15. The method of claim 13, further comprising inserting a low-density foam material within the rotor blade add-on component.

16. The method of claim 13, wherein the one or more support members may include at least one of a laminate composite material, a metal material, a polymer material, or a wood material.

17. The method of claim 13, further comprising forming one or more continuous locating features on the rotor blade add-on component via the thermoforming mold, the one or more locating features corresponding to one or more structures on the rotor blade, wherein the locating features assist in aligning the rotor blade add-on component on the rotor blade.

18. The method of claim 13, further comprising cutting extra material from the rotor blade add-on component.

* * * * *